US010009084B2

(12) United States Patent
Kim et al.

(10) Patent No.: US 10,009,084 B2
(45) Date of Patent: Jun. 26, 2018

(54) METHOD OF PERFORMING A HYBRID BEAMFORMING IN A WIRELESS COMMUNICATION SYSTEM AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/113,999

(22) PCT Filed: Feb. 13, 2015

(86) PCT No.: PCT/KR2015/001497
§ 371 (c)(1),
(2) Date: Jul. 25, 2016

(87) PCT Pub. No.: WO2015/147445
PCT Pub. Date: Oct. 1, 2015

(65) Prior Publication Data
US 2016/0344463 A1    Nov. 24, 2016

Related U.S. Application Data

(60) Provisional application No. 61/969,277, filed on Mar. 24, 2014.

(51) Int. Cl.
*H04W 72/04* (2009.01)
*H04B 7/06* (2006.01)
(Continued)

(52) U.S. Cl.
CPC ........ *H04B 7/0617* (2013.01); *H04B 7/0456* (2013.01); *H04B 7/0639* (2013.01); *H04W 16/28* (2013.01); *H04W 72/046* (2013.01)

(58) Field of Classification Search
CPC .. H04B 7/0617; H04B 7/0456; H04B 7/0639; H04W 72/046; H04W 16/28
See application file for complete search history.

(56) References Cited

U.S. PATENT DOCUMENTS 7,248,841 B2 * 7/2007 Agee .................... H04B 7/0417
 455/101
2011/0188597 A1 * 8/2011 Agee .................... H04B 7/0413
 375/267

(Continued)

FOREIGN PATENT DOCUMENTS

WO   WO 2013/191517 A1   12/2013
WO   WO 2015/137636 A2   9/2015

*Primary Examiner* — Jay P Patel
(74) *Attorney, Agent, or Firm* — Birch, Stewart, Kolasch & Birch, LLP

(57) ABSTRACT

A method of performing a beamforming in a base station of a wireless communication system according to one embodiment of the present invention may include determining an effective range of an analog beam based on a gain of an analog beamforming in a hybrid beamforming, determining a precoding matrix for a digital beamforming in the hybrid beamforming based on the effective range of the analog beam, and performing the hybrid beamforming having the digital beamforming and the analog beamforming coupled therein based on the effective range and the precoding matrix.

13 Claims, 10 Drawing Sheets

(51) Int. Cl.
*H04B 7/0456* (2017.01)
*H04W 16/28* (2009.01)

(56) References Cited

U.S. PATENT DOCUMENTS

| | | |
|---|---|---|
| 2013/0044650 A1 | 2/2013 | Barker et al. |
| 2013/0202054 A1 | 8/2013 | Khan et al. |
| 2013/0229307 A1 | 9/2013 | Chang et al. |
| 2013/0258972 A1 | 10/2013 | Kim et al. |
| 2013/0301454 A1 | 11/2013 | Seol et al. |
| 2014/0328423 A1* | 11/2014 | Agee ............... H04B 7/0413 375/267 |
| 2015/0289281 A1* | 10/2015 | Kim ............... H04L 5/0023 375/267 |

* cited by examiner

METHOD OF PERFORMING A HYBRID BEAMFORMING IN A WIRELESS COMMUNICATION SYSTEM AND APPARATUS THEREFOR

CROSS REFERENCE TO RELATED APPLICATIONS

This application is the National Phase of PCT International Application No. PCT/KR2015/001497, filed on Feb. 13, 2015, which claims priority under 35 U.S.C. 119(e) to U.S. Provisional Application No. 61/969,277, filed on Mar. 24, 2014, all of which are hereby expressly incorporated by reference into the present application.

TECHNICAL FIELD

The present invention relates to a method of performing a hybrid beamforming having different beamforming schemes coupled therein in a wireless communication system and apparatus therefor.

BACKGROUND ART

MIMO (multiple-input multiple-output) used in a wireless communication system is a scheme of increasing channel capacity and enhancing transceiving efficiency using multiple transmitting antennas and/or multiple receiving antennas. MIMO may be called a multi-antenna.

In MIMO environment, it may be unnecessary for data to be transmitted on a single antenna path. For instance, in MIMO environment, a receiver can reconfigure data by aggregating data fragments respectively received through a plurality of receiving antennas. Comparing a single antenna environment and an MIMO environment to each other, a data rate can be improved by maintaining a cell area size or coverage can be increased by maintaining a data rate, in MIMO environment.

A beamforming scheme in MIMO environment is widely used for a base station, a user equipment, a relay or the like. The beamforming scheme can be classified into a digital beamforming scheme or an analog beamforming scheme depending on whether a weight vector/matrix (or a precoding vector/matrix) is used for a baseband or an RF band. And, the digital beamforming scheme is applied to a precoding procedure of 3G/4G mobile communication system. For instance, in a current mobile communication system, a user equipment feds back a precoding matrix index (PMI) to a base station for a closed-loop based digital beamforming and the base station performs a beamforming based on the PMI.

Technical Task

The technical task of the present invention is to provide a method of efficiently performing a hybrid beamforming having different beamforming schemes coupled therein in a wireless communication system and an apparatus therefor.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, a method of performing a beamforming in a base station of a wireless communication system according to one embodiment of the present invention may include determining an effective range of an analog beam based on a gain of an analog beamforming in a hybrid beamforming, determining a precoding matrix for a digital beamforming in the hybrid beamforming based on the effective range of the analog beam, and performing the hybrid beamforming having the digital beamforming and the analog beamforming coupled therein based on the effective range and the precoding matrix.

To further achieve these and other advantages and in accordance with the purpose of the present invention, as embodied and broadly described, in performing a beamforming in a wireless communication system, a base station according to another embodiment of the present invention may include a processor determining an effective range of an analog beam based on a gain of an analog beamforming in a hybrid beamforming, the processor determining a precoding matrix for a digital beamforming in the hybrid beamforming based on the effective range of the analog beam, the processor performing the hybrid beamforming having the digital beamforming and the analog beamforming coupled therein based on the effective range and the precoding matrix and a transmitter transmitting downlink data to a user equipment by the hybrid beamforming.

Preferably, the base station determining the effective range of the analog beam may set a minimum gain to be necessarily obtained through the analog beam and may determine a range of angles at which a gain of a transmission through the analog beam becomes equal to or greater than the set minimum gain.

Preferably, the base station determining the effective range of the analog beam may determine the effective range based on a parameter (α) corresponding to a minimum gain to be necessarily obtained through the analog beam, the number ($N_t^{RF}$) of antenna elements per RF (Radio Frequency chain) chain for performing the analog beamforming, a distance (d) between the antenna elements, and an antenna wavelength (λ). For instance, the effective range may be determined based on a formula:

$$\Delta\theta = \alpha \frac{\lambda}{(N_t^{RF} - 1)d}.$$

Preferably, the base station determining the precoding matrix may select a first PMI (precoding matrix index) set from a codebook and may select at least one PMI from the first PMI set. In this case, the first PMI set may be selected based on at least one of a boresight angle of the analog beam and the effective range. More preferably, the codebook may include a first effective range having the first PMI set mapped thereto, a first boresight angle to which a plurality of effective ranges including the first effective range are mapped, and a plurality of boresight angles including the first boresight angle.

Preferably, the base station determining the precoding matrix may determine whether a first PMI (precoding matrix index) set corresponding to a boresight angle of the analog beam and a second PMI set corresponding to a prescribed angle adjacent to the boresight angle of the analog beam overlap with each other in part at least. If the first PMI set and the second PMI set overlap with each other in part at least, the base station may select at least one PMI from the first PMI set by excluding an overlapping portion from the first PMI set.

Preferably, if the effective range is changed, at least one of a resolution of the digital beamforming and a resolution of the analog beamforming may be changed.

Preferably, the base station determining the precoding matrix may select at least one PMI from a codebook including a first PMI (precoding matrix index) set corresponding to a first effective range and a second PMI set corresponding to a second effective range based on the determined effective range. In this case, the number of first PMIs included in the first PMI set may be equal to the number of second PMIs included in the second PMI set. And, an interval between digital beams generated by the first PMIs may be different from an interval between digital beams generated by the second PMIs.

Preferably, the base station may determine whether a shade of the analog beamforming exists between the analog beam and a steered analog beam steered by a first unit angle based on the first unit angle for steering the analog beam and the effective range. If the shade of the analog beamforming is determined as existing, the base station may change the first unit angle into a second unit angle.

To further achieve these and other advantages and in accordance with the purpose of the present invention, as embodied and broadly described, a method of receiving a signal through a beamforming in a user equipment of a wireless communication system according to further embodiment of the present invention may include receiving a first reference signal through a first analog beam among a plurality of analog beams formed in different directions by an analog beamforming, transmitting information on the first analog beam having the first reference signal received therethrough to a base station, and receiving downlink data by a hybrid beamforming having the analog beamforming and a digital beamforming coupled therein, wherein a precoding matrix for the digital beamforming is determined based on an effective range of the first analog beam.

To further achieve these and other advantages and in accordance with the purpose of the present invention, as embodied and broadly described, in receiving a signal through a beamforming in a wireless communication system, a user equipment according to another further embodiment of the present invention may include a receiver receiving a first reference signal through a first analog beam among a plurality of analog beams formed in different directions by an analog beamforming, the receiver receiving downlink data by a hybrid beamforming having the analog beamforming and a digital beamforming coupled therein, a transmitter transmitting information on the first analog beam having the first reference signal received therethrough to a base station, and a processor controlling the receiver and the transmitter, wherein a precoding matrix for the digital beamforming is determined based on an effective range of the first analog beam.

Advantageous Effects

According to an embodiment of the present invention, a digital beam and an analog beam can be optimized in accordance with a desired beamforming gain and a hybrid beamforming having the analog beam and the digital beam coupled therein can be performed efficiently.

Effects obtainable from the present invention may be non-limited by the above mentioned effect. And, other unmentioned effects can be clearly understood from the following description by those having ordinary skill in the technical field to which the present invention pertains.

MODE FOR INVENTION

Reference will now be made in detail to the preferred embodiments of the present invention, examples of which are illustrated in the accompanying drawings. Configurations, functions and other features of the present invention can be easily understood through the embodiments of the present invention.

In the present specification, a name of a base station can be used as an inclusive terminology for RRH (remote control head), eNB, TP (transmission point), RP (repetition point), RN (relay) or the like. Moreover, in case of applying carrier aggregation, an operation of a base station described by the invention may be applicable to a component carrier (CC) or a cell. A beamforming covers the precoding concept and a weight vector/matrix for a beamforming covers the concept of a precoding vector/matrix.

MIMO Environment

Figure 1:
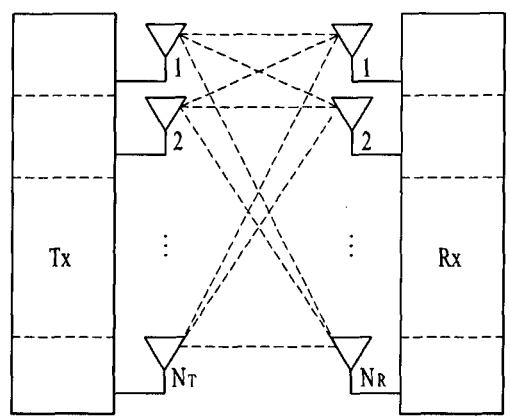
FIG. 1 is a diagram of a general MIMO environment.

A general MIMO (multi-input multi-output) environment is described with reference to FIG. 1 as follows.

$N_T$ transmitting antennas are installed on a transmitting stage, while $N_R$ receiving antennas are installed on a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_0$ by a rate increasing rate $R_i$, as shown in Formula 1. In this case, $R_i$ is a smaller one of $N_T$ and $N_R$.

$$R_i = \min(N_T, N_R) \qquad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 1, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \qquad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1$, $x_2, \ldots, x_{N_T}$ may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \qquad \text{[Formula 5]}$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank(H)) is limited by Formula 6.

$$\text{rank}(H) \leq \min(N_T, N_R) \qquad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix H may be represented as Formula 7.

$$\text{\# of streams} \leq \text{rank}(H) \leq \min(N_T, N_R) \qquad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

The maximum number of transceiving antennas is assumed as 8 in a general MIMO environment. Yet, as the MIMO environment is evolved into a massive MIMO, the number of antennas can increase over tens or hundreds.

Figure 2:
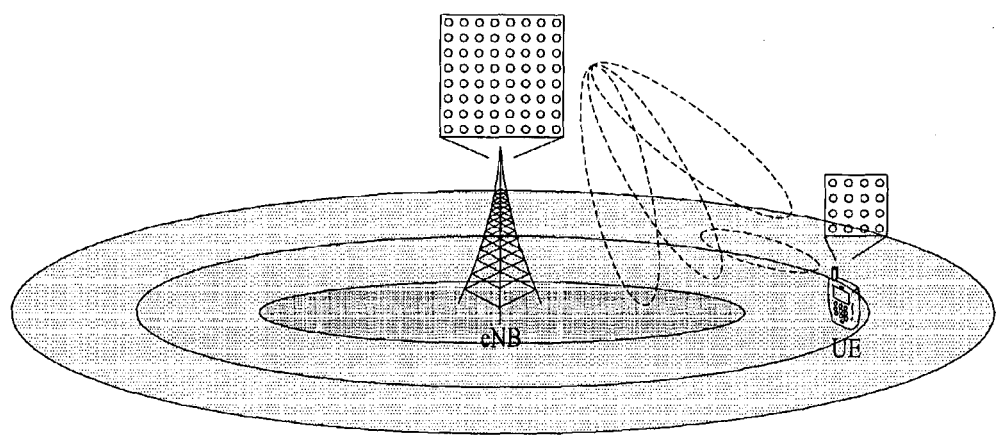
FIG. 2 is a diagram of a massive MIMO environment.

FIG. 2 shows one embodiment of a massive MIMO environment. Particularly, FIG. 2 diagrammatizes a system in which a base station or user equipment has a plurality of transmitting/receiving antennas capable of an active antenna system based 3D beamforming.

Referring to FIG. 2, if a 3D (3-dimensional) beam pattern is utilized in a transmitting antenna aspect, it is able to perform a quasi-static or dynamic beamforming in a vertical direction of a beam as well as in a horizontal direction of the beam. And, it is also able to consider application such as a sector forming in a vertical direction or the like. Moreover, in a receiving antenna aspect, when a receiving beam is formed using massive receiving antennas, it is able to expect a signal power increasing effect in accordance with an antenna array gain. Hence, in case of uplink, a base station can receive a signal transmitted from a user equipment through a plurality of antennas. In doing so, it is advantageous in that the user equipment can set its transmission power to a very low power in consideration of a gain of the massive receiving antennas in order to reduce interference influence.

Analog Beamforming & Digital Beamforming

Figure 3:
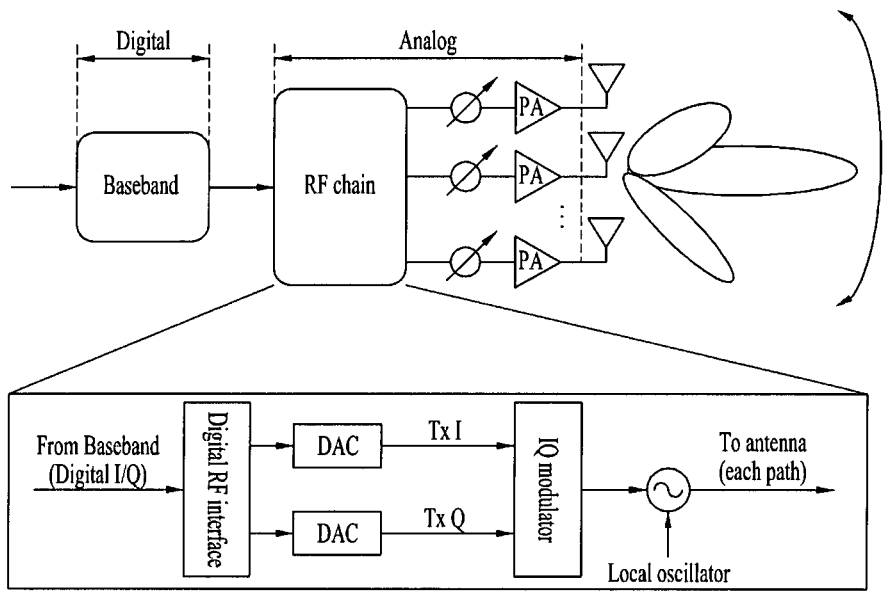
FIG. 3 is a diagram for one example of an analog beamforming scheme.

FIG. 3 is a diagram for one example of an analog beamforming scheme. An analog beamforming scheme is a representative beamforming scheme applied to an initial multi-antenna structure. A beamforming is performed in a manner as follows. First of all, after a digital signal processing has been completed, an analog signal is made to diverge into a plurality of paths. Secondly, phase shift (PS) and power amplification (power amplifier: PA) are set up on each of the diverging paths.

Referring to FIG. 3, an analog beamforming is performed in a manner that a power amplifier and a phase shifter connected to an antenna process an analog signal outputted from a single digital signal. In an analog stage, the phase shifter and the power amplifier applies a complex weight to the analog signal. In FIG. 1, an RF (radio frequency) chain means a processing block for converting a signal digital signal to an analog signal.

Yet, according to an analog beamforming scheme, accuracy of a beam is determined depending on characteristics of devices of the phase shifter and the power amplifier. Hence, in aspect of controlling the devices of the phase shifter and the power amplifier, the analog beamforming scheme is appropriate for a narrowband transmission. According to the analog beamforming scheme, since complexity of a hardware structure increases considerably in case of implementing a multi-stream transmission, it is difficult to improve a transmission rate through a multiplexing gain and it is also difficult to perform a beamforming per user based on orthogonal resource allocation.

Figure 4:
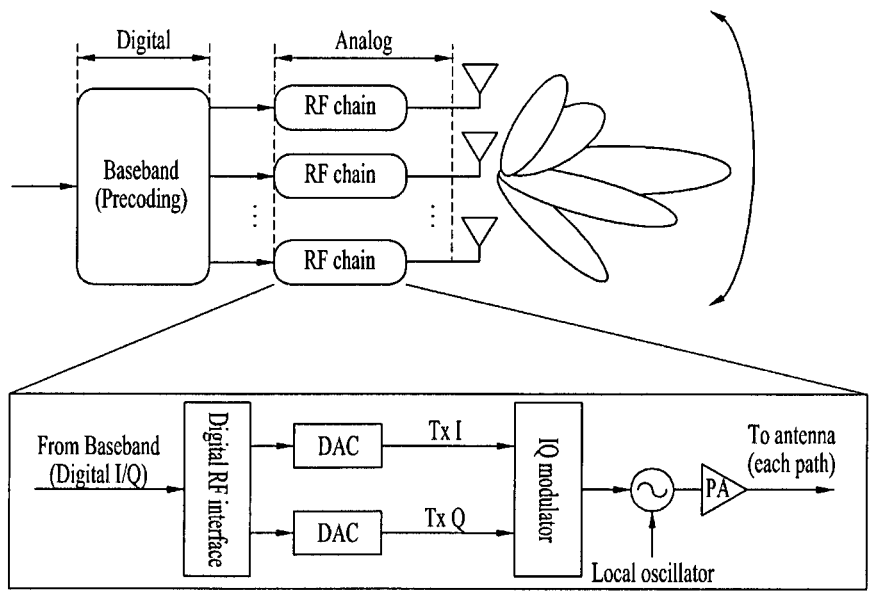
FIG. 4 is a diagram for one example of a digital beamforming scheme.

FIG. 4 is a diagram for one example of a digital beamforming scheme. According to the digital beamforming scheme, a beamforming is performed in a digital stage using a baseband process. Hence, unlike the analog beamforming scheme, the digital beamforming scheme is appropriate for maximizing diversity and multiplexing gain in an MIMO environment.

Referring to FIG. 4, application of a weight matrix (or a precoding matrix), e.g., a precoding is performed in a baseband process. In case of a digital beamforming, unlike the case of the analog beamforming shown in FIG. 1, an RF chain includes a power amplifier. The reason for this is that a complex weight for a beamforming is directly applied to a transmitted data.

Moreover, according to a digital beamforming scheme, it is able to form a beam different for each user. For instance, beams for multiple users can be simultaneously formed. Since it is possible to implement a digital beamforming independent for each user to which an orthogonal resource is allocated, a scheduling is relatively free and an operation of a transmitting stage in accordance with a system purpose is facilitated. Moreover, if MIMO-OFDM (orthogonal frequency division multiplexing) and technology are applied in a broadband transmission environment, it is able to form a beam independent per subcarrier. Thus, according to the digital beamforming scheme, since system capacity and beam gain are improved, a transmission rate for each user can be maximized.

In order to apply a digital beamforming technology in a massive MIMO environment, since a baseband processor should perform a precoding process for hundreds of antennas, digital signal processing complexity increases considerably. Moreover, since RF chains are required as many as the number of antennas, hardware implementation complexity increases considerably. Particularly, in case of FDD (frequency division duplex) system, since feedback information on massive MIMO channels for the entire antennas is required, it is disadvantageous in that a reference signal (or pilot signal) transmission and feedback overhead for the corresponding transmission are increased considerably.

If an analog beamforming technology is applied in a massive MIMO environment, hardware complexity of a transmitting stage is relatively low, an performance increase extent using multiple antennas is insignificant, and flexibility of resource allocation is lowered. Particular, in case of a broadband transmission, it is very difficult to control a beam per frequency.

Table 1 shows performance gain and complexity relations between an analog beamforming scheme and a digital beamforming scheme.

TABLE 1

|  | Beamforming accuracy control facilitation | Multicarrier beam control | Multi-stream transmission | Hardware complexity (BB process) | Pilot and feedback overhead |
|---|---|---|---|---|---|
| Analog beamforming scheme | Low (PA/PS device characteristics and relation) | Impossible or difficult | Impossible or difficult | Low | Low |
| Digital beamforming scheme | High | Possible | Possible | High | High |

Modeling of Hybrid Beamforming

In a massive MIMO environment according to one embodiment of the present invention, instead of selectively applying one of an analog beamforming scheme and a digital beamforming scheme, it is able to apply a hybrid beamforming resulting from combining an analog beamforming structure and a digital beamforming structure together. Therefore, in order to lower hardware implementation complexity of a transmitting stage and to obtain a maximum beamforming gain using a massive MIMO, it is necessary to design a transmitting stage structure of a hybrid type.

Figure 5:
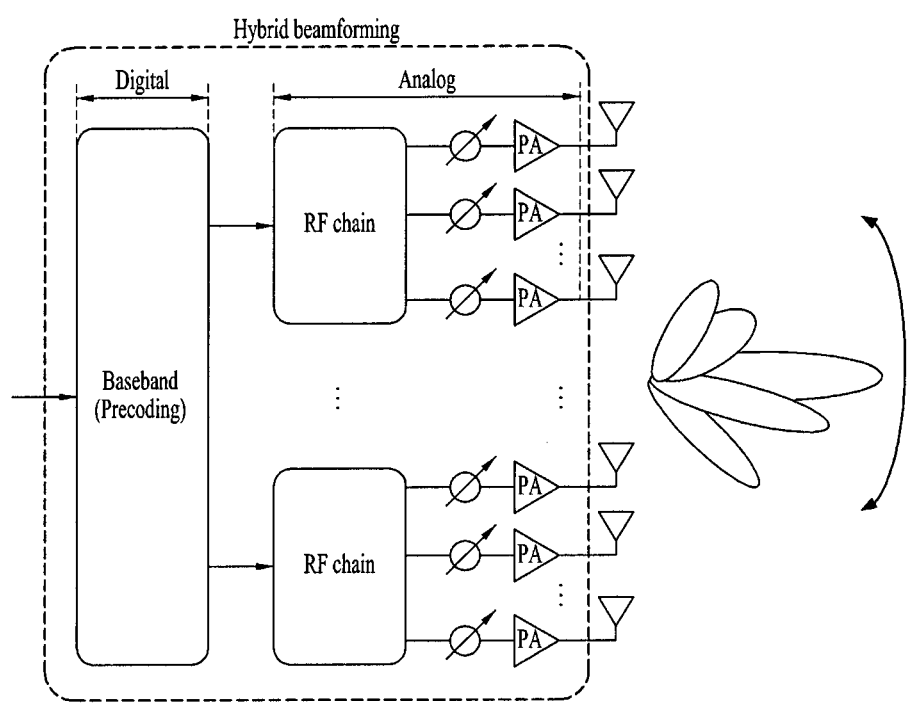
FIG. 5 is a diagram to describe the concept of a hybrid beamforming according to one embodiment of the present invention.

FIG. 5 is a diagram to describe the concept of a hybrid beamforming according to one embodiment of the present invention. According to a hybrid beamforming, a digital signal of a baseband having a digital beamforming scheme applied thereto is primarily converted to an analog signal of an RF band and an analog beamforming scheme is secondarily applied to the analog signal. Hence, for a hybrid beamforming scheme, a transmitting stage should be able to support both of the digital beamforming scheme and the analog beamforming scheme.

Items or matters taken into consideration for a hybrid beamforming are described as follows.

It is difficult to simultaneously optimize an analog beamforming and a digital beamforming. Basically, a digital beamforming is able to apply a beamforming scheme independent per user with the same time-frequency resource. On the other hand, an analog beamforming has a limitation such that a beamforming scheme common to users should be applied with the same time-frequency resource. The limitation of the analog beamforming causes difficulty in optimizing the supportable rank number, beam control flexibility and beamforming resolution in a hybrid beamforming.

An analog beamforming scheme for forming a beam in a specific direction only in the same time-frequency resource has difficulty in forming a plurality of beams in all user equipment direction at the same time. Hence, the analog beamforming scheme causes a problem that UL/DL control channel, reference signal, synchronization signal and the like are not transmitted simultaneously to all user equipments distributed in all areas in a cell.

In case of performing channel estimation on an analog/digital beam, a digital beamforming scheme can use an existing orthogonal pilot assignment as it is. Yet, in an analog beamforming scheme, a time-duration amounting to the number of beam candidates is required. A time delay taken for a channel estimation of an analog beam is relatively long. In case of estimating a digital beam and an analog beam simultaneously, complexity increases considerably.

According to a digital beamforming scheme, a beamforming for multiple users/streams is free. Yet, according to an analog beamforming scheme, since a beamforming by the same weight vector/matrix is performed on a full transmission band, it is difficult to perform a beamforming independent per user or stream. Particularly, since FDMA (e.g., OFDMA) support through orthogonal frequency resource allocation is difficult, it is difficult to optimize a frequency resource.

In the following description, feedback methods for a hybrid beamforming are explained in consideration of the features or properties mentioned in the foregoing description. First of all, in an existing mobile communication system that uses one of an analog beamforming scheme and a digital beamforming scheme, performing a closed loop based beamforming (or precoding) is facilitated. For instance, a user equipment receives a reference signal transmitted by a base station and then determines a precoding matrix index (PMI), a rank indicator (RI), and a channel quality indicator (CQI). The user equipment feeds back a channel state information (CSI) containing the PMI, CQI and/or RI to the base station. Subsequently, the base station performs a beamforming using the PMI transmitted by the user equipment. Alternatively, the base station may perform a beamforming using a different PMI without being restricted by the PMI transmitted by the user equipment.

Thus, in case that the existing method is intactly applied to a hybrid beamforming, a user equipment should measure and report a PMI for an analog beamforming and a PMI for a digital beamforming, respectively. Hence, overhead for the measurement and reporting increases twice. Moreover, if the PMI for the analog beamforming and the beamforming for the digital beamforming are different from each other, it causes another problem. For instance, assuming that an optimal PMI for an analog beamforming and an optimal PMI for a digital beamforming indicate a zero-degree direction and a 30-degree direction, respectively, since a direction of an analog beam and a direction of a digital beam are different from each other, a gain of a hybrid beamforming may be represented as low considerably.

According to one embodiment of the present invention, it is able to determine a PMI for a digital beamforming based on a measurement of an analog beam. For instance, a user equipment feeds back only a measurement result of an analog beam to a base station and may not feed back a PMI for a digital beamforming. For another instance, a user equipment may determine a PMI for a digital beamforming using a measurement result of an analog beam. A measurement result of the analog beam and the PMI for the digital beamforming may be fed back to a base station.

Figure 6:
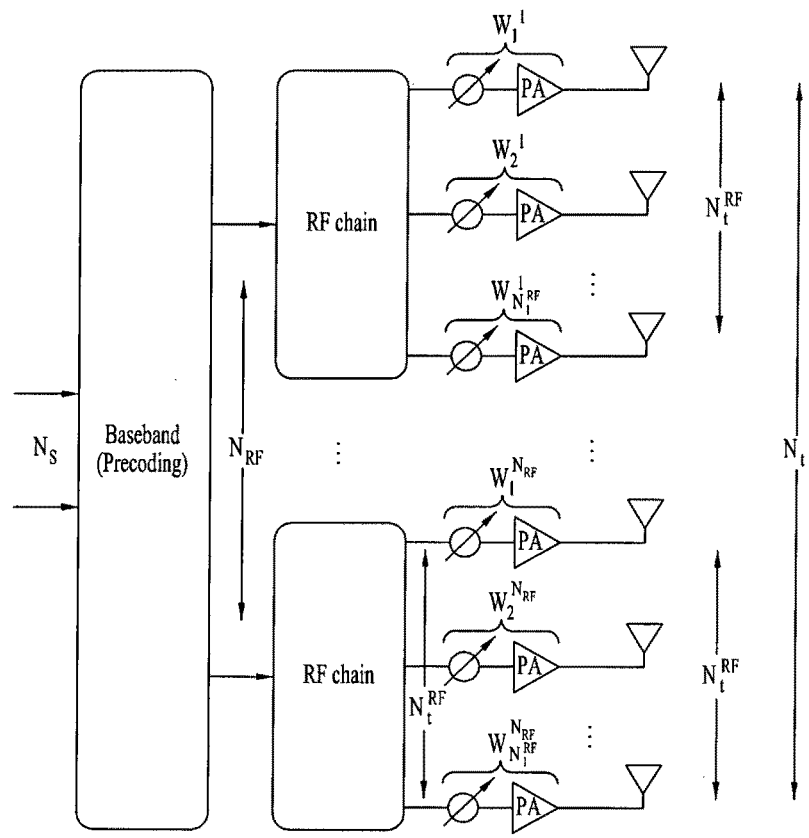
FIG. 6 is a diagram of a structure of a transmitting stage for performing a hybrid beamforming according to one embodiment of the present invention.

FIG. 6 is a diagram of a structure of a transmitting stage for performing a hybrid beamforming according to one embodiment of the present invention. According to the present embodiment, each RF chain is assumed as including $N_t^{RF}$ independent antennas, by which the present embodiment is non-limited. For instance, the number of antennas provided to each RF chain may be configured differently.

According to the present embodiment, a relation of $N_t = N_t^{RF} \times N_{RF}$ exists among the total antenna number $N_t$, the RF chain number $N_{RF}$ and the per-RF chain antenna number $N_t^{RF}$. Since a signal having passed through a phase shifter and a power amplifier per RF chain is sent to a transmitting antenna, a system model can be defined as Formula 8.

$$y_k = H_k F^{RF} F_k^{BB} s_k + z_k \qquad \text{[Formula 8]}$$

In Formula 8, the k indicates a subcarrier index. The subcarrier index k has a value ranging 0 to $(N_{FFT}-1)$. The $N_{FFT}$ indicates a maximum FFT (Fast Fourier Transform) size supported by a system. And, the total subcarrier number may be limited to a range within the FFT size.

The $y_k$ means a received signal vector having a size '$N_r \times 1$' in the subcarrier k. The $H_k$ means a channel matrix having a size of '$N_r \times N_t$' in the subcarrier k. The $F^{RF}$ means an RF precoder (i.e., a weight matrix for an analog beamforming) having a size of '$N_t \times N_t$' in a whole subcarrier. And, the RF precoder (analog beamforming) may be identically applicable to the whole subcarrier. The $F_k^{BB}$ means a baseband precoder (i.e., a weight matrix for a digital beamforming) having a size of '$N_{RF} \times N_s$' in the subcarrier k. And, the baseband precoder (digital beamforming) may be individually configured per subcarrier. The $s_k$ indicates a transmitted signal vector having a size of '$N_s \times 1$' in the subcarrier k and the $z_k$ indicates a noise signal vector having a size of '$N_r \times 1$' in the subcarrier k.

The $N_{RF}$ indicates the total number of RF chains, the $N_t$ means the total number of the transmitting stage antennas, and the $N_t^{RF}$ means the number transmitting antennas provided per RF chain. The $N_r$ indicates the total number of the receiving stage antennas and the $N_s$ indicates the number of transmitted data streams.

Each term in Formula 8 is represented in detail as Formula 9.

$$\begin{bmatrix} y^{(1)} \\ \vdots \\ y^{(Nr)} \end{bmatrix} = \begin{bmatrix} h_{11} & h_{12} & \cdots & h_{1Nt} \\ h_{21} & h_{22} & \cdots & h_{2Nt} \\ \vdots & \vdots & \ddots & \vdots \\ h_{Nr1} & h_{Nr2} & \cdots & h_{NrNt} \end{bmatrix} \quad \text{[Formula 9]}$$

$$F^{RF}\left(\begin{bmatrix} v_{1,1} & v_{1,2} & \cdots & v_{N_{RF},N_s} \\ v_{2,1} & v_{2,2} & \cdots & v_{N_{RF},N_s} \\ \vdots & \vdots & \ddots & \vdots \\ v_{N_{RF},1} & v_{N_{RF},2} & \cdots & v_{N_{RF},N_s} \end{bmatrix} \begin{bmatrix} x^{(1)} \\ \vdots \\ x^{(N_s-1)} \end{bmatrix}\right) +$$

$$\begin{bmatrix} z^{(1)} \\ \vdots \\ z^{(Nr)} \end{bmatrix}$$

The '$N_t \times N_{RF}$' precoding matrix $F^{RF}$ of an analog beamforming performed after an RF chain by a phase shifter and a power amplifier can be expressed as Formula 10 in the following.

$$F^{RF} = \begin{bmatrix} w_{N_t^{RF}}^1 & 0 & 0 & \cdots & 0 \\ 0 & w_{N_t^{RF}}^2 & 0 & \cdots & 0 \\ 0 & 0 & w_{N_t^{RF}}^3 & \cdots & 0 \\ \vdots & \vdots & \vdots & \ddots & \vdots \\ 0 & 0 & 0 & \cdots & w_{N_t^{RF}}^{N_{RF}} \end{bmatrix} \quad \text{[Formula 10]}$$

Moreover, a vector indicating a weight for each of t antennas belonging to an RF chain I in the precoding matrix $F^{RF}$ can be defined as Formula 11 in the following.

$$w_{N_t^{RF}}^j = \begin{bmatrix} w_1^j \\ w_2^j \\ \vdots \\ w_{N_t^{RF}}^j \end{bmatrix} \quad \text{[Formula 11]}$$

Beam Radiation Pattern of Hybrid Beamforming

A hybrid beamforming scheme of the present invention can be performed based on one of antennas of various types including a 1D array, a 2D array, a ring type array and the like. For clarity of the following description, a beam radiation pattern of a hybrid beamforming is described based on ULA (Uniform linear array) antenna. The ULA antenna is exemplarily illustrated, by which the scope of the appended claims and their equivalents is non-limited. In the ULA antenna, a plurality of antenna elements are linearly arrayed in a manner of being spaced apart from each other by an equal space d.

An array response vector of the ULA antenna is expressed as Formula 12 in the following.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \cdots & \exp\left(j2\pi \times (N_t - 1) \times \frac{d}{\lambda}\sin(\theta)\right) \end{bmatrix}^T$$

[Formula 12]

In Formula 12, the $\lambda$ indicates a wavelength and the d indicates an inter-antenna distance. For clarity, in order to represent an antenna radiation pattern of a hybrid beamformer, the RF chain number $N_{RF}$ is assumed as 4 and the per-RF chain analog antenna number $N_t^{RF}$ is assumed as 4.

Figure 7:
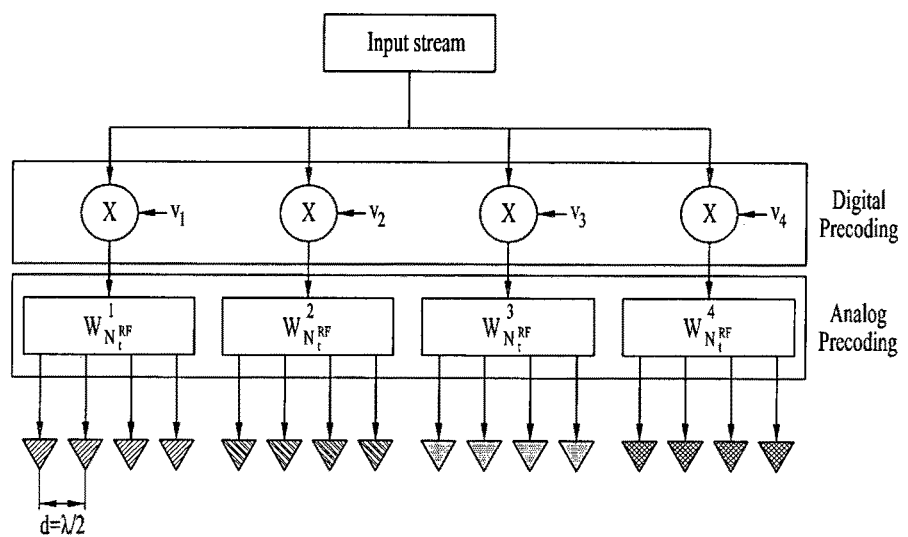
FIG. 7 is a diagram of 16-ULA antenna structure configured with 4 RF chains according to one embodiment of the present invention.

FIG. 7 is a diagram of 16-ULA antenna structure configured with 4 RF chains according to one embodiment of the present invention. Particularly, in FIG. 7, the total transmitting antenna number $N_t$ is 16 and it is d=$\lambda$/2. According to the example shown in FIG. 7, a precoding matrix for an analog beamforming is defined as Formula 13.

$$F^{RF} = \begin{bmatrix} w_{N_t^{RF}}^1 & 0 & 0 & 0 \\ 0 & w_{N_t^{RF}}^2 & 0 & 0 \\ 0 & 0 & w_{N_t^{RF}}^3 & 0 \\ 0 & 0 & 0 & w_{N_t^{RF}}^4 \end{bmatrix}, \quad \text{[Formula 13]}$$

$$w_{N_t^{RF}}^j = \begin{bmatrix} w_1^j \\ w_2^j \\ w_3^j \\ w_4^j \end{bmatrix}$$

In order to form a beam toward a boresight, i.e., a direction of a center of a main lobe of a radio wave radiating from an antenna, a steering angle of the beam is set to 0°. Hence, a value of each of elements of weight vectors of an analog precoding matrix becomes 1. In this case, a random weight vector of a rank 1, which is to be applied to a digital beamforming stage, is defined as Formula 14 in the following. For clarity, a rank 1 is assumed, by which the present invention is non-limited.

$$F^{BB} = v_1 = [v_1 v_2 v_3 v_4]^T \quad \text{[Formula 14]}$$

A antenna array response vector to which the digital beamforming of Formula 14 is applied at the boresight ($\theta$=0°) can be represented as Formula 15. In this case, an inter-antenna distance d is assumed as $\lambda$/2.

[Formula 15]

$$\sum a(\theta) = \sum_{i=0}^{15} a_i(\theta) =$$

$$(1 + \exp(j\pi \times \sin(\theta)) + \exp(j\pi 2 \times \sin(\theta)) + \exp(j\pi 3 \times \sin(\theta))) \times v_1 +$$
$$(\exp(j\pi 4 \times \sin(\theta)) + \exp(j\pi 5 \times \sin(\theta)) +$$
$$\exp(j\pi 6 \times \sin(\theta)) + \exp(j\pi 7 \times \sin(\theta))) \times v_2 +$$
$$(\exp(j\pi 8 \times \sin(\theta)) + \exp(j\pi 9 \times \sin(\theta)) + \exp(j\pi 10 \times \sin(\theta)) +$$
$$\exp(j\pi 11 \times \sin(\theta))) \times v_3 + (\exp(j\pi 12 \times \sin(\theta)) +$$
$$\exp(j\pi 13 \times \sin(\theta)) + \exp(j\pi 14 \times \sin(\theta)) + \exp(j\pi 15 \times \sin(\theta))) \times v_4$$

Formula 15 can be summarized into Formula 16.

$$\sum a(\theta) = (1 + \exp(j\pi\sin(\theta)) + \exp(j\pi 2\sin(\theta)) +$$

$$\exp(j\pi 3\sin(\theta))) \times (v_1 + \exp(j\pi 4\sin(\theta)) \cdot v_2 +$$

$$\exp(j\pi 8\sin(\theta)) \cdot v_3 + \exp(j\pi 12\sin(\theta)) \cdot v_4)$$

$$= \left(\sum_{i=1}^{4} s_i\right) \times \left(\sum_{i=1}^{4} t_i\right)$$

$$= \sum s \times \sum t$$

[Formula 16]

The s in Formula 16 is expressed as Formula 17 and shall be named a beam bound vector. And, the t in Formula 16 is expressed as Formula 18 and shall be named a beam gain and steering vector or a beam steering vector.

$$s = \begin{bmatrix} 1 \\ e^{j\pi\sin(\theta)} \\ e^{j\pi 2\sin(\theta)} \\ e^{j\pi 3\sin(\theta)} \end{bmatrix}$$

[Formula 17]

$$t = \begin{bmatrix} 1 & 0 & 0 & 0 \\ 0 & e^{j\pi 4\sin(\theta)} & 0 & 0 \\ 0 & 0 & e^{j\pi 8\sin(\theta)} & 0 \\ 0 & 0 & 0 & e^{j\pi 12\sin(\theta)} \end{bmatrix} \begin{bmatrix} v_1 \\ v_2 \\ v_3 \\ v_4 \end{bmatrix}$$

[Formula 18]

The beam bound vector s indicates a pattern of an analog beam in a hybrid beamforming. The beam steering vector t indicates a gain of a hybrid beam and a pattern of a digital beam in a hybrid beamforming.

The beam bound vector s determines a range and boundary for forming a hybrid beam validly by a hybrid beamforming scheme. Hence, a range of a digital beamforming is limited within a beam bound vector as well as a range of an analog beamforming. For instance, since an analog beam cannot be validly formed over the range of the beam bound vector, it is unable to perform a hybrid beamforming over the range of the beam bound vector. Eventually, since the digital beamforming should be performed within the range of the beam bound vector, it is able to perform the hybrid beamforming.

Figure 8:
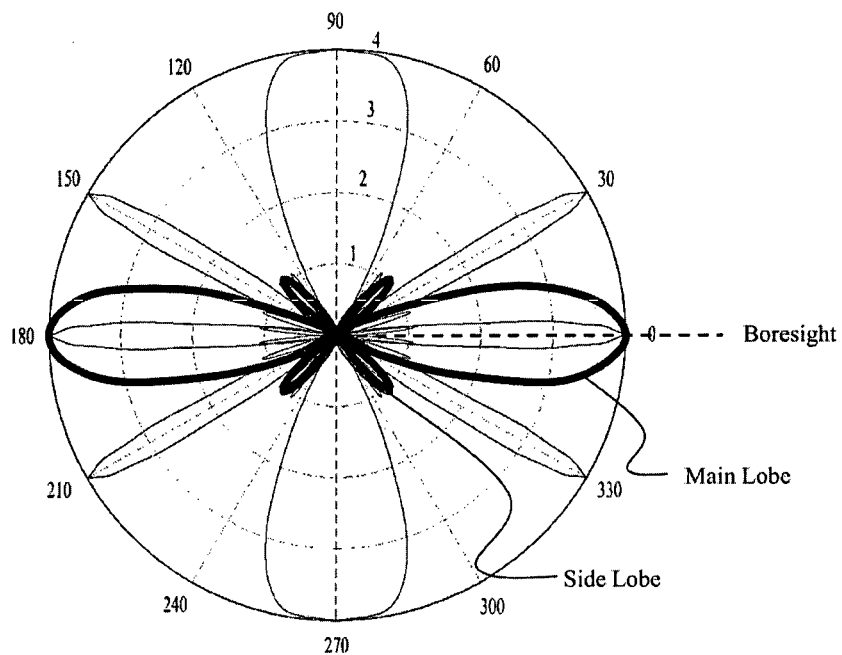
FIG. 8 is a diagram of beam patterns by a beam bound vector and a beam steering vector.

FIG. 8 shows patterns of an analog beam and a digital beam by a beam bound vector and a beam steering vector in a prescribed plane 2-dimensionally. Although an analog beam and a digital beam can be illustrated in 3D pattern, it is apparent to those skilled in the art that they are illustrated in horizontal cross-sections for clarity of the following description. In FIG. 8, $N_t=16$, $N_t^{RF}=4$, $N_{RF}=4$ are assumed. A beam pattern of a beam bund vector is denoted by a thick line, while a beam pattern of a beam steering vector is denoted by a thin line. A boresight of a main lobe of the beam bound vector is 0 degree (or 180 degrees).

A pattern of each beam has a maximum gain at a beam steering angle (i.e., a boresight of a main lobe). As the pattern deviates from the beam steering angle, a beam gain is reduced. The beam gain is represented as a distance from a circle center shown in FIG. 8. A steering angle of a beam is represented as increasing counterclockwise with reference to zero degree.

A beam steering vector can form a beam at 0 degree, 30 degrees, 90 degrees, 150 degrees, 180 degrees, 210 degrees, 270 degrees, or 330 degrees. A hybrid beamforming can be performed in an area where a beam pattern of a beam bound vector and a beam pattern of a beam steering vector cross with each other. For instance, when a steering angle is 0 (or 180), since a gain by a beam bound vector and a gain by a beam steering vector become maximum values, respectively, it is appropriate for a hybrid beamforming to be performed at a point where a steering angle is 0 degree (or 180 degrees). On the other hand, when a steering angle is 30 degrees, since a gain of a beam bound vector is 0, it is unable to perform a hybrid beamforming on the steering angle '30 degrees'.

Figure 9:
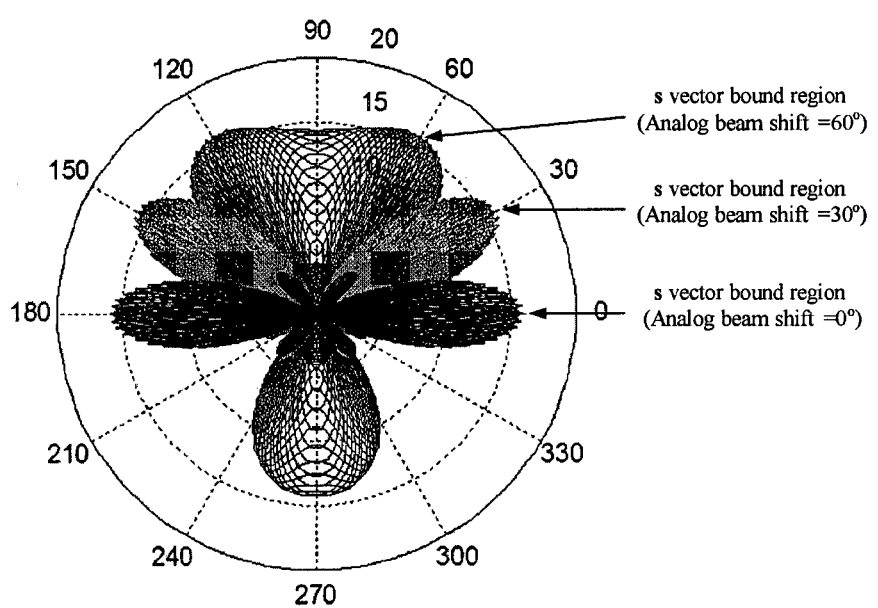
FIG. 9 is a diagram of a beam pattern of a final antenna array response vector in response to an analog beam transition according to one embodiment of the present invention.

FIG. 9 shows an antenna array response when a steering angle of an analog beam is shifted at 0 degree, 30 degrees, or 60 degrees. In FIG. 8, it is assumed that $N_t=16$, $N_t^{RF}=4$, $N_{RF}=4$. And, a result from applying digital $v_1=[v_1\ v_2\ v_3\ v_4]^T$ is shown in FIG. 9. As mentioned in the foregoing descriptions with reference to FIG. 8 and FIG. 9, a range of a valid beam is limited by the vector s.

Effective Range of Analog Beam & Operating Range of Digital Beam

As mentioned in the foregoing description, a range of an analog beam formed by an analog beamforming is limited by a beam bound vector s. In Formula 17, it is assumed that 4 analog antennas exist in a single RF chain. In case that $N_t^{RF}$ antennas are connected to a single RF chain, a beam bound vector is represented as Formula 19.

$$s = \begin{bmatrix} 1 \\ e^{j\pi\sin(\theta)} \\ e^{j\pi 2\sin(\theta)} \\ \vdots \\ e^{j\pi \times (N_t^{RF}-1)\times\sin(\theta)} \end{bmatrix}$$

[Formula 19]

Referring to Formula 19, a beam bound vector is determined depending on the number of antennas connected to a single RF chain. For instance, if 4 RF chains exist and 4 analog antennas are connected to each of the 4RF chains, all the antennas configure the ULA structure shown in FIG. 7.

By analyzing a beam bound vector, it is able to roughly determine a boundary of a whole hybrid beam formed centering on a boresight of a fixed analog beam. For instance, if all the antennas are used, it is able to obtain a shape of a final beam bound vector shown in FIG. 9. If a weight $F^{RF}$ of an analog beamforming for determining a boresight (or direction) of an analog beam is given, it is able to predict an effective range for effectively performing the analog beamforming. In this case, the effective range means a range for acquiring a gain intended to be obtained through the analog beamforming. For instance, if an analog beamforming is performed in a wrong direction, a gain of the analog beamforming will become very low. In this case, it may be meaningless to perform the analog beamforming. A minimum gain intended to be obtained through an analog beamforming may vary depending on a system design, which is expressed as a parameter α. A relation between an effective range and a parameter α can be defined as Formula 20.

$$\Delta\theta = \alpha \frac{\lambda}{Nd}$$

[Formula 20]

In Formula 20, since an antenna wavelength (λ) and an inter-antenna distance (d) and the per-RF chain antenna number (N=$N_t^{RF}$-1) are known, it is able to obtain an effective range by adjusting the design parameter α.

Meanwhile, since a finally formed hybrid beam is result from a combination of a digital beamforming and an analog beamforming, the digital beamforming should be performed within an effective range of the analog beamforming. Based on the effective range of the analog beamforming, an operating range and PMI of the digital beamforming can be determined.

In particular, in case of attempting to acquire a gain (e.g., ½ of a gain at boresight) equal to or greater than 3 dB bandwidth from an analog beamforming in a hybrid beamforming, the parameter α is set to 0.886 (i.e., α=0.886). The effective range can be expressed as Formula 21.

$$\Delta\theta_{3dB} = 0.886 \frac{\lambda}{Nd} \quad \text{[Formula 21]}$$

Assuming $$d = \frac{\lambda}{2}, N = N_t^{RF} - 1,$$

and the per-RF chain antenna number 4, the 3 dB beamwidth $\Delta\theta_{3\ db}$ is calculated into '0.866×(⅔)×(180/π)≈33.8°'.

Based on this, an operating range of a digital beamforming can be represented as Formula 22.

$$-\frac{\Delta\theta_{3dB}}{2} \leq \frac{\pi\phi}{N_t^{RF}} \leq \frac{\Delta\theta_{3dB}}{2} \quad \text{[Formula 22]}$$

PMI is determined in consideration of φ in Formula 22. As mentioned in the foregoing description, φ means a steering angle of a digital beamforming. Through this, PMI v of a beam steering vector t can be determined. Namely, the configuration shown in Formula 23 is determined.

$$v = \begin{bmatrix} v_1 \\ v_2 \\ \vdots \\ v_{N_{RF}} \end{bmatrix} \quad \text{[Formula 23]}$$

Figure 10:
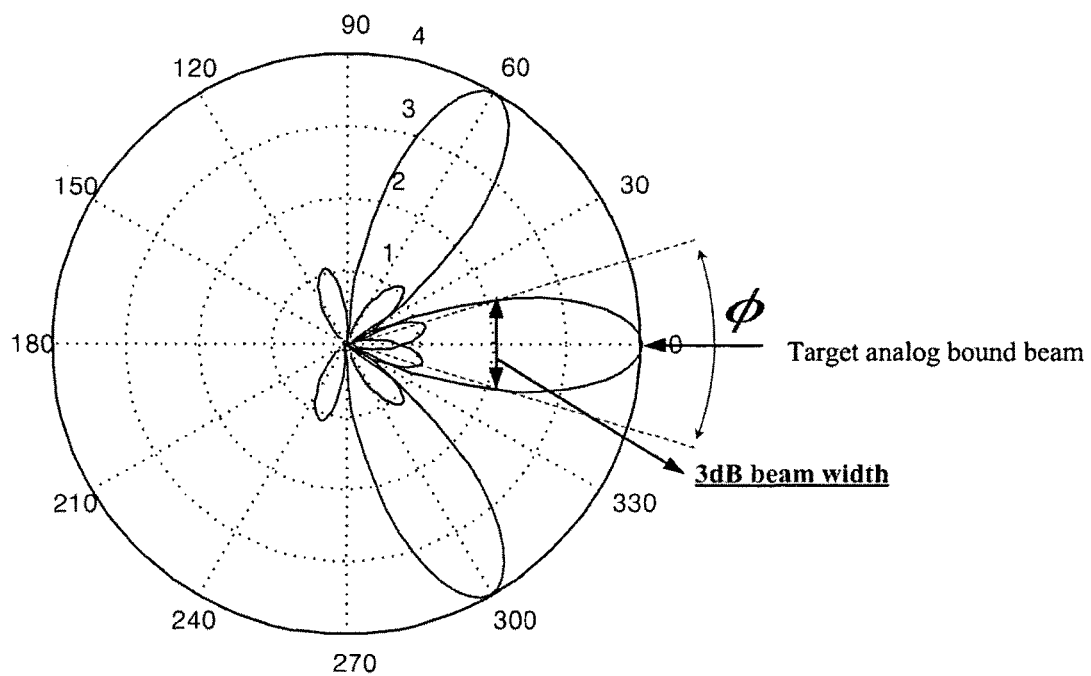
FIG. 10 is a diagram of an operating range of a digital beam in accordance with an effective range of an analog beamforming according to one embodiment of the present invention.

FIG. 10 shows an operating range of a digital beam in consideration of 3 dB beamwidth if an analog beamforming is performed at 0° or ±60°. Table 2 shows a correlation between a parameter α and an effective range of a beam bound vector.

TABLE 2

| Parameter$^\alpha$ | Beamwidth (degree) | Minimum beam gain (dB) |
|---|---|---|
| α = 0.866 | $\Delta\theta_{3dB} = 0.886\frac{\lambda}{Nd}$ | $G_{min}$ = 3 dB |
| α > 0.866 | Δθ > $\Delta\theta_{3dB}$ | $G_{min}$ < 3 dB |
| α < 0.866 | Δθ < $\Delta\theta_{3dB}$ | $G_{min}$ > 3 dB |

A base station can change a parameter α to correspond to a communication environment. For instance, in an environment in which users are concentrated, by setting the parameter α to a low value, it is able to select a PMI that maximizes a beam gain in a user equipment. On the other hand, in an environment in which user equipments are distributed more widely, by raising the parameter α, a selective range of the OMI is increased to cover a wide range despite that a beam gain is reduced.

Meanwhile, according to the embodiment mentioned in the foregoing description, the number $N_t^{RF}$ of analog antennas included in each RF chain is assumed as equal for example, by which the present invention is non-limited. For instance, n antennas may be included in a first RF chain, while k antennas may be included in a second RF chain (where n≠k). Thus, if the number of antennas included in each RF chain is different per RF chain, an effective range Δθ of an analog beam calculated by Formula 20 is different for each RF chain. For instance, if a parameter α is 0.866, a first effective range is calculated for the first RF chain based on $$0.866 \times \frac{\lambda}{nd},$$

while a second effective range is calculated for the second RF chain based on $$0.866 \times \frac{\lambda}{kd}.$$

In this case, since the first effective range and the second effective range differ from each other in value, a base station is able to determine an effective range of a final analog beam which is to be applied in common to all RF chains. For instance, if the effective ranges calculated for the respective RF chains are different from each other, the base station is able to determine a minimum effective range among the calculated effective ranges as a final effective range. According to another embodiment, the base station may be able to determine a maximum effective range among the calculated effective ranges as a final effective range. According to another embodiment, the base station can determine a final effective range by averaging the calculated effective ranges. According to another embodiment, the base station can determine a final effective range by a leaner function of applying prescribed weights to the calculated effective ranges. According to further embodiment, after an RF chain is set as a reference in advance, the base station can determine an effective range set for the reference RF chain as a final effective range. And, it is apparent to those skilled in the art that various effective range determining methods are available as well as the above-mentioned embodiments or examples.

PMI of Digital Beam According to Effective Range of Analog Beam

As mentioned in the foregoing description, in case that an effective range is adjusted in accordance with a parameter α, a PMI for a digital beamforming should be adjusted together. A codebook is designed to enable a digital beam to be located in an effective range and a PMI should be selected from the corresponding codebook. Table 3 shows one example of a codebook according to one embodiment of the present invention.

TABLE 3

| Beam bound pattern | Effective beam bandwidth($\Delta\theta$) | PMI |
|---|---|---|
| Beam #1 (Boresight = 0°) | $\Delta\theta = L_1$ | $P_1$ |
| | | $P_2$ |
| | | . |
| | | . |
| | | . |
| | | $P_L$ |
| Beam #2 (Boresight = 30°) | $\Delta\theta = L_1$ | $P_{L+1}$ |
| | | $P_{L+2}$ |
| | | . |
| | | . |
| | | . |
| | | $P_{2L}$ |
| . | . | . |
| . | . | . |
| . | . | . |

Meanwhile, a steering angle for performing an analog beamforming is limitative. And, a fine extent of the steering angle is represented as a resolution of the analog beamforming. For instance, a case that a beamforming is possible by 30° unit like Case 1: {0, 30, 60 . . . } has a resolution lower than that of a case that a beamforming is possible by 5° unit like Case 2: {0, 5, 10 . . . }. A maximum resolution of an analog beamforming is determined by mechanical performance of an analog device. In particular, since a resolution limit of a phase shifter configured to perform an analog beamforming is limitative, an analog beamforming has difficulty in performing a beamforming by fine unit like a digital beamforming. Hence, when antennas are designed, a maximum resolution of a supportable analog beamforming is determined in advance.

Assuming that a resolution of an analog beamforming is not changed, effective ranges may overlap with each other depending on a parameter α. For instance, an effective range of a first analog beam having a steering angle set to 0 degree is assumed as ranging between −16.5 degrees and +16.5 degrees approximately and an effective range of a second analog beam having a steering angle set to 30 degrees is assumed as ranging between 13.5 degrees and +46.5 degrees approximately. In this case, a range between 13.5 degrees and 16.6 degrees belongs to the effective range of each of the first analog beam and the second analog beam.

Hence, as the effective ranges overlap with each other, a PMI of a first digital beam corresponding to the first analog beam may be equal to a PMI of a second digital beam corresponding to the second analog beam. For instance, some PMIs in a codebook may overlap with each other.

Figure 11:
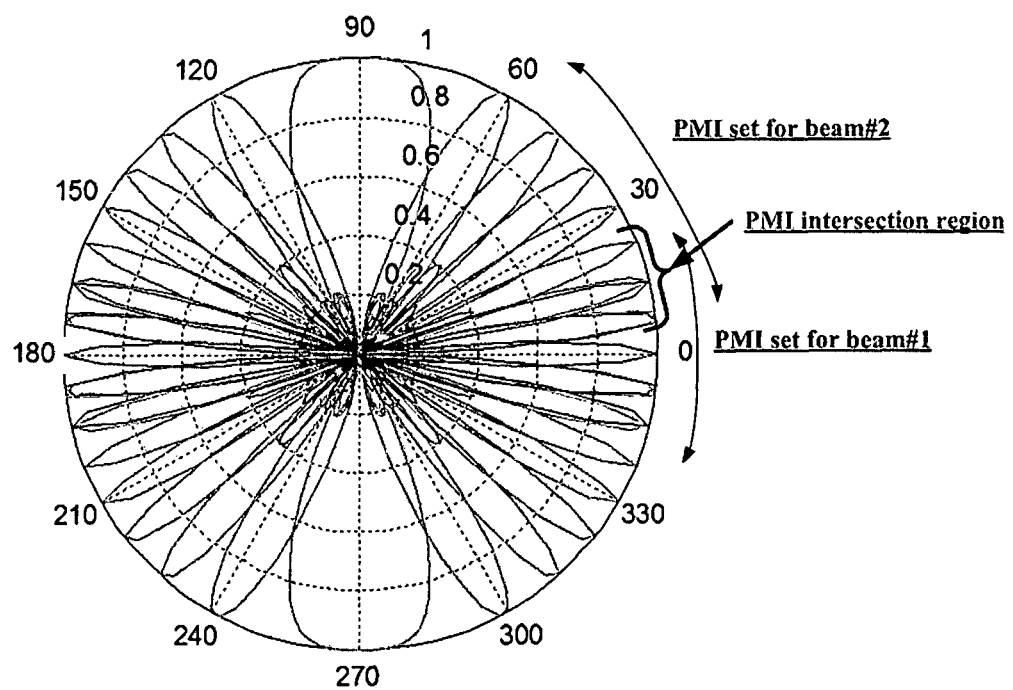
FIG. 11 is a diagram of an overlap of PMI by an overlap of an effective range according to one embodiment of the present invention.

FIG. 11 shows a case that PMIs overlap with each other. In case that effective ranges shown in FIG. 11 overlap with each other, it is preferable that the effective range is adjusted by a parameter α. For instance, the reason for this is that a user equipment located in an overlapping area may experience interference caused by a beamforming for another user equipment.

As an effective range is changed into L2 from L1, if a single PMI of each beam bound vector overlaps with a PMI of another beam bound vector in the codebook shown in Table 3, the codebook shown in Table 3 is readjusted into Table 4. For instance, when an effective range is L2, the codebook is changed in a manner that $P_L$ is not used doubly used at 'boresight=0' and 'boresight=30'.

TABLE 4

| Beam bound pattern | Effective beam bandwidth($\Delta\theta$) | PMI |
|---|---|---|
| Beam #1 (Boresight = 0°) | $\Delta\theta = L_2$ | $P_1$ |
| | | $P_2$ |
| | | . |
| | | . |
| | | . |
| | | $P_{L-1}$ |
| Beam #2 (Boresight = 30°) | $\Delta\theta = L_2$ | $P_L$ |
| | | $P_{L+2}$ |
| | | . |
| | | . |
| | | . |
| | | $P_{2L-2}$ |
| M | M | M |

Resolution of Digital Beam According to Effective Range of Analog Beam

According to one embodiment of the present invention, a resolution of a digital beam can be determined depending on an effective range of an analog beam. For instance, if an effective range increases, an interval between selectable digital beams may increase. If an effective range decreases, an interval between selectable digital beams may decrease. Although an effective range is changed, the number of selectable PMIs can be maintained constantly.

Figure 12:
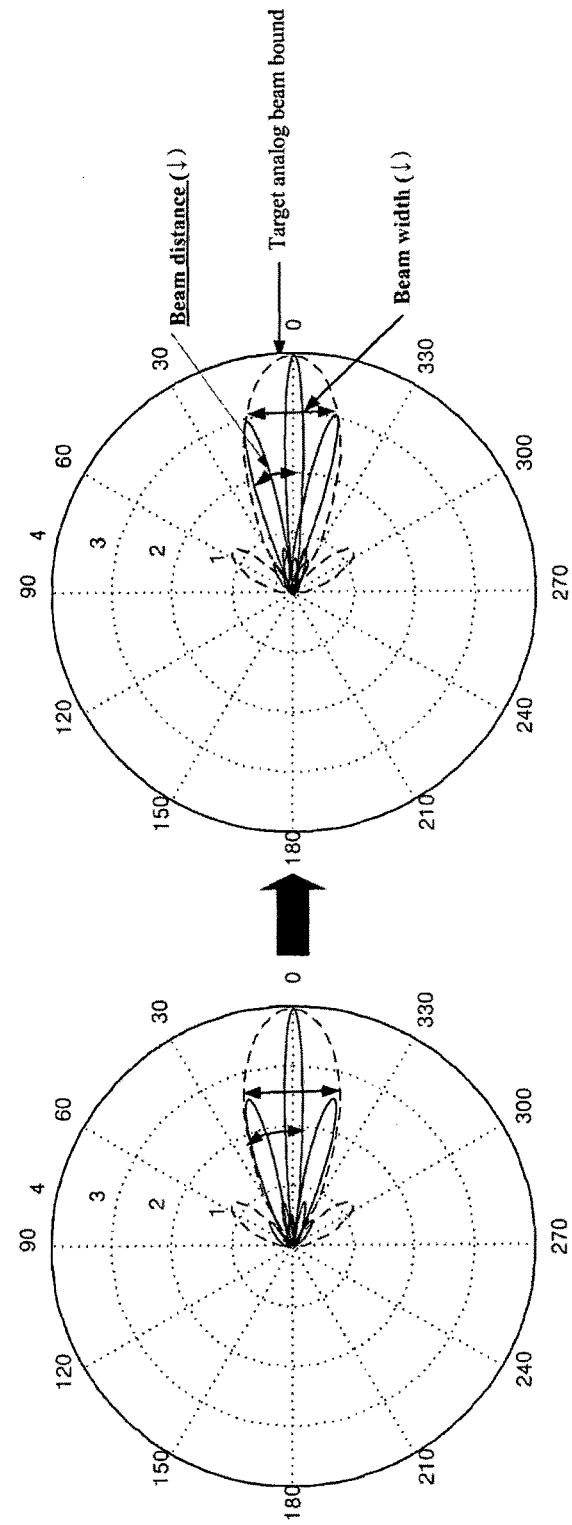
FIG. 12 is a diagram to describe a resolution change of a digital beam according to one embodiment of the present invention.

In particular, if the number of digital beams formable in a first effective range of a first analog beam (e.g., boresight=0) is $N_i$, although an effective range is changed, the $N_i$ can be maintained intact. For instance, referring to FIG. 12, although an effective range decreases, the number (=3) of digital beams formable in the effective range is maintained intact. Yet, an interval between digital beams is changed. This corresponds to a resolution change of a digital beam.

Thus, as the digital beam interval is changed, a steering angle (i.e., boresight) of a digital beam is changed. Hence, a PMI for the interval-changed digital beam should be newly defined.

In a base station, PMI sets (e.g., codebook) differing from each other in resolution may be set in advance. Based on an effective range or a parameter α, the base station can determined whether to use the PMI set.

According to another embodiment, a base station may reuse a single codebook. For instance, a PMI of a codebook can be modified in accordance with an effective range or a parameter α.

Referring to Table 5, a plurality of PMI sets differing from each other in resolution per effective range in a single beam bound vector are defined. Although, the number (L) of PMIs available for an effective range L1 is equal to the number (L) of PMIs available for an effective range L2, it is $P_1^{L_1} \neq P_1^{L_2}$. In other words, a digital beam formed on the basis of $P_1^{L_1}$ may be located in a direction different from that of a digital beam formed on the basis of $P_1^{L_2}$.

TABLE 5

| Beam bound pattern | Effective beam bandwidth($\Delta\theta$) | PMI |
|---|---|---|
| Beam #1 (Boresight = 0°) | $\Delta\theta = L_1$ | $P_1^{L_1}$ |
| | | $P_2^{L_1}$ |
| | | . |
| | | . |
| | | . |
| | | $P_L^{L_1}$ |
| | $\Delta\theta = L_2$ | $P_1^{L_2}$ |
| | | $P_2^{L_2}$ |

TABLE 5-continued

| Beam bound pattern | Effective beam bandwidth($^{\Delta\theta}$) | PMI |
|---|---|---|
| . | . | . |
|  |  | $P_L^{L2}$ |
| . | . | . |
| . | . | . |
| . | . | . |

Resolution of Analog Beam According to Effective Range of Analog Beam

A base station is able to adjust a resolution of an analog beam by a beam bound vector in accordance with an effective range. A maximum resolution of an analog beamforming is determined by performance of a phase shifter.

For instance, if α is set to $α_1$ ($α=α_1$), an effective range is assumed as 30°. If α is set to $α_2$ ($α=α_2$), an effective range is assumed as 20°. If an effective range is changed from 30° to 20°, a beamforming resolution of an analog beam should be readjusted. When an effective range is 20°, if a steering angle of an analog beamformer ($F^{RF}$) is set to 0°, ±30°, or ±60°, a blank of 10° is generated from each beam unit. For instance, when a boresight difference between a first analog beam and a second analog beam is 30°, if an effective range of each of the first analog beam and the second analog beam is 20°, a shade failing to belong to each of the first analog beam and the second analog beam is generated from the 10° interval located between the first analog beam and the second analog beam. Hence, it is preferable that steering angles of an analog beamformer ($F^{RF}$) are readjusted from 0°, ±30°, ±60° into $F^{RF}$=0°, ±20°, ±40°, ±60°, respectively.

Thus, a beamforming precoder is designed in consideration of a range in which an analog beam can be effectively transmitted. A hybrid beamformer is configured to operate in a manner that an analog beamforming and a digital beamforming are basically coupled together. In this case, an applicable range of a digital PMI can be determined and designed through the relation between an analog beam and RF chain. An analog beam is estimated in accordance with the number of analog chains connected to each RF chain, whereby a digital beamforming PMI is designed. Through this, a hybrid beamforming can be efficiently performed and complexity of a beam control can be lowered.

Meanwhile, the applicable scope of the embodiments mentioned in the foregoing description is non-limited by the hybrid beamforming. For instance, the present embodiments are applicable to a case that an analog beamforming state is replaced by a digital beamforming stage. Digital beamforming can be performed sequentially and serially on each antenna subgroup through antenna subgrouping. Thus, the present embodiments are applicable to a digital beamforming scheme having the hierarchical structure.

For clarity, the foregoing description is made with reference to a downlink, by which the present invention is non-limited. The present embodiments are applicable to various combinations of transmitters and receivers. For instance, the present embodiments are applicable to an uplink transmission scenario for a user equipment-to-base station transmission, an inter-user equipment (e.g., D2D, V2V, etc.) signal transmission scenario, an inter-base station (e.g., relay, wireless backhaul, etc.) signal transmission scenario and the like.

Figure 13:
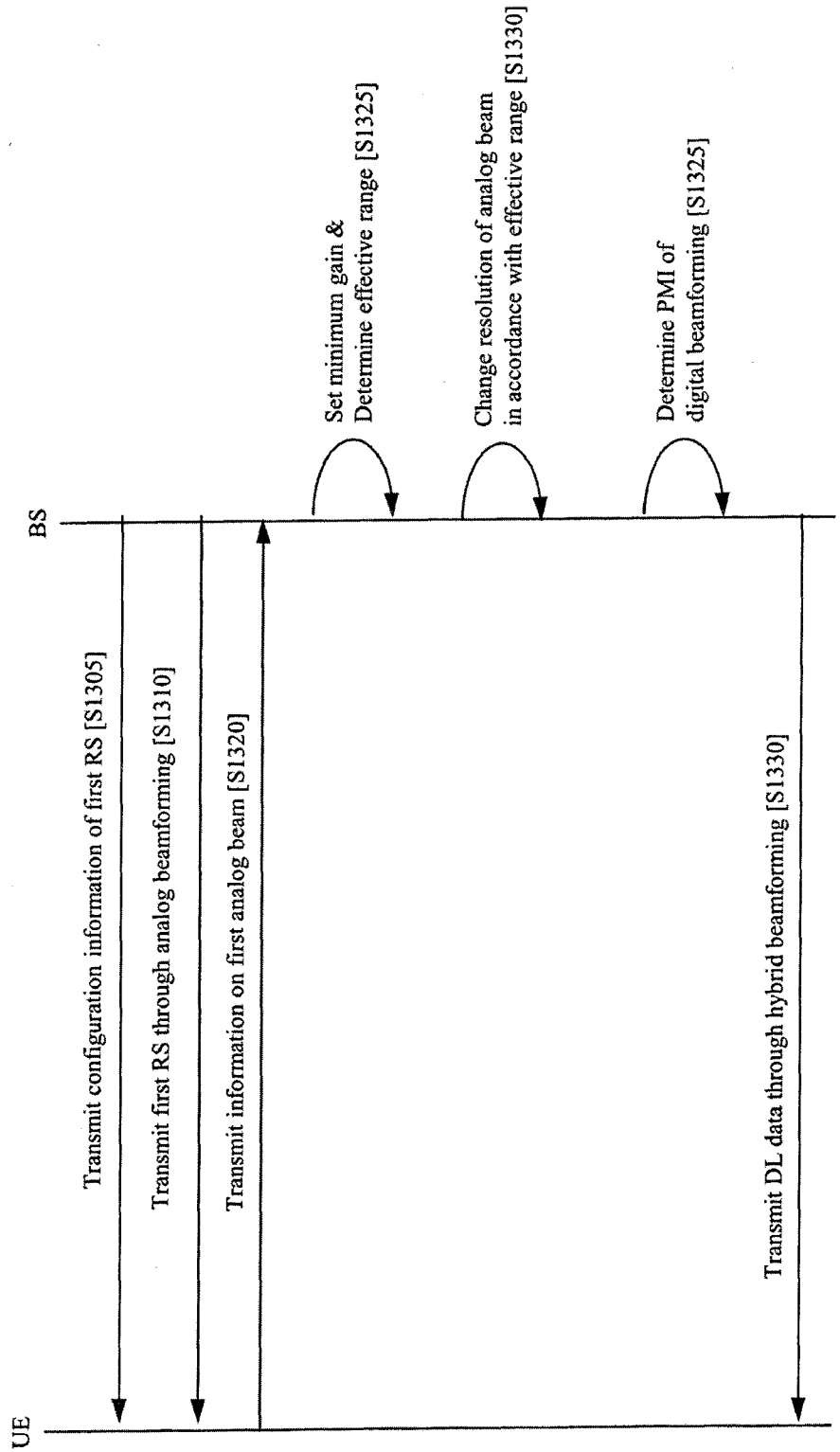
FIG. 13 is a diagram of a hybrid beamforming method according to one embodiment of the present invention.

FIG. 13 is a diagram of a hybrid beamforming method according to one embodiment of the present invention. Details redundant with the foregoing description shall be omitted from the following description.

Referring to FIG. 13, a base station transmits a configuration information of a first reference signal to a user equipment [S1305]. In this case, the configuration information of the first reference signal is transmitted by RRC signaling or may be broadcasted through a system information. The configuration information of the first reference signal may include information on a period or frequency for transmitting the first reference signal, information on a resource element to which the first reference signal will be mapped, and the like, by which the signal configuration information may be non-limited.

The base station transmits the first reference signal through an analog beamforming [S1310]. The base station can form analog beams for various directions. For instance, the base station can form 12 analog beams for 12 directions by 30° unit. A plurality of analog beams can be formed sequentially in accordance with time.

The user equipment receives the first reference signal through a first analog beam. Although the first signal is transmitted through a plurality of analog beams, the user equipment is not able to receive the first reference signal through all the analog beams. The user equipment receives the first reference signal through at least one analog beam formed in a direction in which the user equipment itself is located.

The user equipment transmits information on the first analog beam [S1320]. For instance, the user equipment can transmit at least one of information on a timing or subframe for receiving the first reference signal, information on an index of the first analog beam, information on a direction of the first analog beam, and information on a gain of the first analog beam to the base station, by which the information is non-limited. The first reference signal may be received through a second analog beam as well as through the first analog beam. In this case, it is preferable that the user equipment transmits information on a prescribed beam having a highest gain to the base station.

A direction of a hybrid beamforming, which is described later, can be determined through the information on the first analog beam. For instance, if a boresight of the first analog beam is 30 degrees, it is preferable that an analog beamforming in the hybrid beamforming is performed in a direction of 30 degrees. Moreover, a digital beamforming in the hybrid beamforming is performed at ±30 degrees (Effective range/2).

The base station determines an effective range of the first analog beam [S1325]. The base station sets a minimum gain ($G_{min}$) that should be obtained through the first analog beam. The base station determines a range of angles at which a gain of a transmission through the first analog beam becomes equal to or greater than the above-set minimum gain. For instance, the effective range can be determined based on Formula 20.

The base station changes a resolution of the analog beam in accordance with the effective range. For instance, based on a first unit angle for steering the first analog beam and the determined effective range, the base station determines whether a shade of the analog beamforming exists between the first analog beam and the second analog beam steered by the first unit angle. If the base station determines that the shade of the analog beamforming exists, the base station changes the first unit angle into a second unit angle.

Based on the effective range of the first analog beam, the base station determines a PMI of the digital beamforming [S1325].

The base station selects a first PMI (precoding matrix index) set from a codebook. The base station selects at least one PMI from the first PMI set. The first PMI set may be selected based on at least one of a boresight angle of the first analog beam and a first effective range. For instance, as mentioned in the foregoing description with reference to Table 5, the codebook may include the first effective range having the first PMI set mapped thereto, a first boresight angle to which a plurality of effective ranges including the first effective range are mapped, and a plurality of boresight angles including the first boresight angle.

The base station is able to determine whether the first PMI (precoding matrix index) set corresponding to the boresight of the first analog beam overlaps with at least one portion of a second PMI set corresponding to a prescribed angle adjacent to the boresight angle of the first analog beam. If the first PMI set and the second PMI set overlap with each other in part at least, the base station is able to select at least one PMI from the first PMI set shown in Table 4 except the overlapping at least one portion.

As the effective range is changed, the resolution of the digital beamforming may be changed. For instance, based on the effective range, the base station selects at least one PMI from the codebook shown in Table 5 including the first PMI (precoding matrix index) set corresponding to the first effective range and the second PMI set corresponding to the second effective range. In this case, the number of first PMIs included in the first PMI set may be equal to that of second PMIs included in the second PMI set. Moreover, an interval between digital beams generated by the first PMIs may be different from an interval between digital beams generated by the second PMIs.

The base station transmits downlink data through the hybrid beamforming [S1330]. For instance, based on the effective range and PMI, the base station performs a hybrid beamforming in which a digital beamforming and an analog beamforming are hierarchically coupled together.

Figure 14:
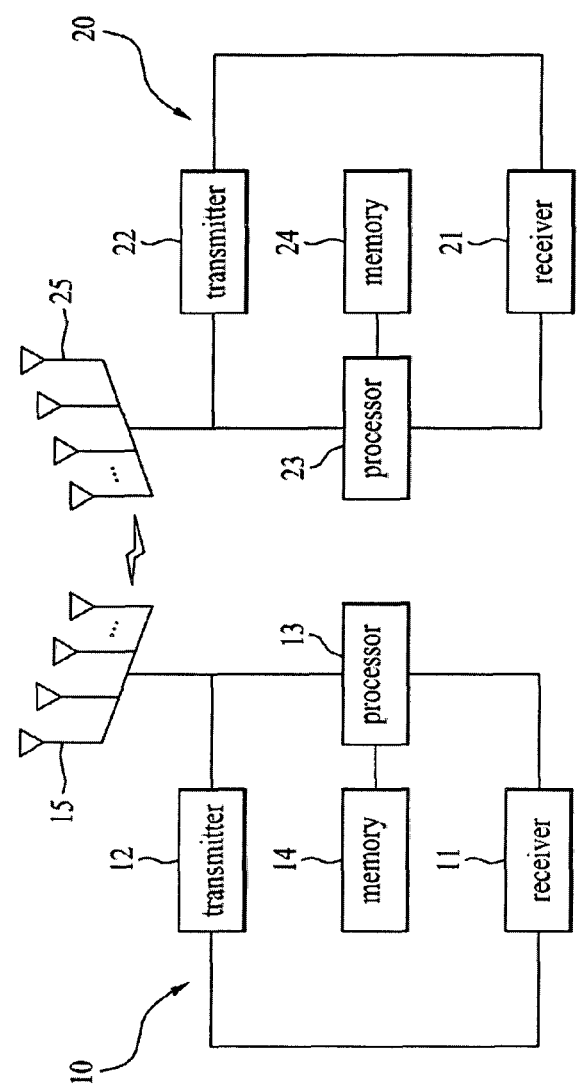
FIG. 14 is a diagram of a base station and a user equipment according to one embodiment of the present invention.

FIG. 14 is a diagram of a configuration of a base station and a user equipment according to one embodiment of the present invention. A base station 10 and a user equipment 20 shown in FIG. 14 can perform the methods mentioned in the foregoing description and redundant details shall be omitted from the following description.

Referring to FIG. 14, a base station 10 may include a receiver 11, a transmitter 12, a processor 13, a memory 14 and a plurality of antennas 15. In this case, a plurality of the antennas 15 may mean a base station supportive of MIMO transmission and reception. The receiver 11 may receive various signals, data and information in uplink from a user equipment. The transmitter 12 may transmit various signals, data and information in downlink to a user equipment. And, the processor 13 may control overall operations of the base station 10.

And, the processor 13 of the base station 10 may perform a function of operating and processing information received by the base station 10, information to be externally transmitted and the like. The memory 14 can store the operated and processed information and the like for a prescribed time and may be substituted with such a component as a buffer (not shown in the drawing) or the like.

According to one embodiment of the present invention, the processor 13 determines an effective range of an analog beam based on a gain of an analog beamforming in a hybrid beamforming. Based on the effective range of the analog beam, the processor 13 determines a precoding matrix for a digital beamforming in the hybrid beamforming. Based on the effective range and the precoding matrix, the processor 13 performs the hybrid beamforming in which the digital beamforming and the analog beamforming are coupled together. The transmitter 12 transmits downlink data to the user equipment through the hybrid beamforming.

A user equipment 20 may include a receiver 21, a transmitter 22, a processor 23, a memory 24 and a plurality of antennas 25. In this case, a plurality of the antennas 25 may mean a user equipment supportive of MIMO transmission and reception. The receiver 21 may receive various signals, data and information in downlink from a base station. The transmitter 22 may transmit various signals, data and information in uplink to a base station. And, the processor 23 may control overall operations of the user equipment 20.

And, the processor 23 of the user equipment 20 may perform a function of operating and processing information received by the user equipment 20, information to be externally transmitted and the like. The memory 24 can store the operated and processed information and the like for a prescribed time and may be substituted with such a component as a buffer (not shown in the drawing) or the like.

According to one embodiment of the present invention, the receiver 21 receives a first reference signal through a first analog beam among a plurality of analog beams formed in different directions by the analog beamforming. The receiver 21 receives downlink data through the hybrid beamforming, having the analog beamforming and the digital beamforming coupled therein. The transmitter 22 transmits information on the first analog beam through which the first reference signal was received to the base station. A precoding matrix for the digital beamforming may be determined based on the effective range of the first analog beam.

Embodiments of the present invention can be implemented using various means. For instance, embodiments of the present invention can be implemented using hardware, firmware, software and/or any combinations thereof.

In case of the implementation by hardware, a method according to each of the embodiments of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each of the embodiments of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Therefore, the present invention is non-limited by the embodiments disclosed herein and intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

As mentioned in the foregoing description, embodiments of the present invention are applicable to various kinds of mobile communication systems.

The invention claimed is:

1. A method of performing a beamforming by a base station in a wireless communication system, the method comprising:
   determining an effective range of an analog beam based on a gain of an analog beamforming in a hybrid beamforming;
   determining a precoding matrix for a digital beamforming in the hybrid beamforming based on the effective range of the analog beam; and
   performing the hybrid beamforming in which the digital beamforming and the analog beamforming are coupled, based on the effective range and the precoding matrix,
   wherein the determination of the effective range of the analog beam comprises:
      setting a minimum gain to be obtained through the analog beam; and
      determining a range of angles at which a gain of a transmission through the analog beam becomes equal to or greater than the set minimum gain.

2. The method of claim 1, wherein in the determining the effective range of the analog beam, the effective range of the analog beam is determined based on a parameter ($\alpha$) corresponding to a minimum gain to be obtained through the analog beam, a number ($N_t^{RF}$) of antenna elements per a radio frequency (RF) chain performing the analog beamforming, a distance (d) between the antenna elements, and an antenna wavelength ($\lambda$).

3. The method of claim 2, wherein the effective range is determined based on a formula:

$$\Delta\theta = \alpha \frac{\lambda}{(N_t^{RF} - 1)d}.$$

4. The method of claim 1, wherein the determination of the precoding matrix comprises:
   selecting a first precoding matrix index (PMI) set from a codebook; and
   selecting at least one PMI from the first PMI set,
   wherein the first PMI set is selected based on at least one of a boresight angle of the analog beam and the effective range.

5. The method of claim 4, wherein the codebook comprises:
   a first effective range to which the first PMI set is mapped;
   a first boresight angle to which a plurality of effective ranges including the first effective range are mapped, and
   a plurality of boresight angles including the first boresight angle.

6. The method of claim 1, wherein the determining of the precoding matrix comprises:
   determining whether a first precoding matrix index (PMI) set corresponding to a boresight angle of the analog beam and a second PMI set corresponding to a prescribed angle adjacent to the boresight angle of the analog beam overlap with each other in part at least; and
   if the first PMI set and the second PMI set overlap with each other in part at least, selecting at least one PMI from the first PMI set by excluding the overlapped part from the first PMI set.

7. The method of claim 1, wherein if the effective range is changed, at least one of a resolution of the digital beamforming and a resolution of the analog beamforming is changed.

8. The method of claim 1, wherein the determination of the precoding matrix comprises selecting at least one precoding matrix index (PMI) from a codebook including a first PMI set corresponding to a first effective range and a second PMI set corresponding to a second effective range based on the determined effective range,
   wherein a number of first PMIs included in the first PMI set is equal to a number of second PMIs included in the second PMI set, and
   wherein a distance between digital beams generated by the first PMIs is different from a distance between digital beams generated by the second PMIs.

9. The method of claim 8, further comprising:
   determining whether a shade of the analog beamforming exists between the analog beam and a steered analog beam steered by a first unit angle based on the first unit angle for steering the analog beam and the effective range; and
   changing the first unit angle into a second unit angle, if the shade of the analog beamforming exists.

10. A method of receiving a signal through a beamforming by a user equipment in a wireless communication system, the method comprising:
    receiving a first reference signal through a first analog beam among a plurality of analog beams formed in different directions by an analog beamforming;
    transmitting information on the first analog beam via which the first reference signal has been received, to a base station; and
    receiving downlink data by a hybrid beamforming in which the analog beamforming and a digital beamforming are coupled,
    wherein a precoding matrix for the digital beamforming is determined based on an effective range of the first analog beam, and
    wherein the effective range comprises a range of angles at which a gain of the first reference signal reception through the first analog beam becomes equal to or greater than a minimum gain set in the base station.

11. The method of claim 10, wherein if the effective range is changed, at least one of a resolution of the digital beamforming and a resolution of the analog beamforming is changed.

12. The method of claim 10, wherein a direction of the hybrid beamforming is determined based on the information on the first analog beam.

13. A user equipment for receiving a signal through a beamforming in a wireless communication system, the user equipment comprising:
    a receiver configured to receive a first reference signal through a first analog beam among a plurality of analog beams formed in different directions by an analog beamforming, and receive downlink data by a hybrid beamforming in which the analog beamforming and a digital beamforming are coupled;

a transmitter configured to transmit information on the first analog beam via which the first reference signal has been received, to a base station; and a processor configured to control the receiver and the transmitter, wherein a precoding matrix for the digital beamforming is determined based on an effective range of the first analog beam, and wherein the effective range comprises a range of angles at which a gain of the first reference signal reception through the first analog beam becomes equal to or greater than a minimum gain set in the base station.

* * * * *